(12) United States Patent
Tafaghodi Khajavi et al.

(10) Patent No.: US 11,783,274 B2
(45) Date of Patent: Oct. 10, 2023

(54) SYSTEMS AND METHODS FOR A DECENTRALIZED HYBRID AIR-GROUND AUTONOMOUS LAST-MILE GOODS DELIVERY

(71) Applicant: Ford Global Technologies, LLC, Dearborn, MI (US)

(72) Inventors: Navid Tafaghodi Khajavi, Troy, MI (US); Mohammad Nekoui, Novi, MI (US); Amin Ariannezhad, Troy, MI (US); Mohsen Bahrami, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/159,048

(22) Filed: Jan. 26, 2021

(65) Prior Publication Data

US 2022/0237554 A1    Jul. 28, 2022

(51) Int. Cl.
*G06Q 10/0832* (2023.01)
*G06Q 10/0833* (2023.01)
*G08G 5/00* (2006.01)
*B64C 39/02* (2023.01)
*G06F 16/907* (2019.01)
(Continued)

(52) U.S. Cl.
CPC ....... *G06Q 10/0832* (2013.01); *B64C 39/024* (2013.01); *G06F 16/907* (2019.01); *G06Q 10/0833* (2013.01); *G08G 5/003* (2013.01); *G08G 5/0013* (2013.01); *B64U 80/86* (2023.01); *B64U 2101/60* (2023.01)

(58) Field of Classification Search
CPC ..... G06Q 50/30; G06Q 50/28; G06Q 10/0832

USPC ......................................................... 705/332
See application file for complete search history.

(56) References Cited

U.S. PATENT DOCUMENTS 9,387,928 B1 *   7/2016   Gentry ................... B60L 53/00
9,411,785 B1 *   8/2016   Wong .................... G06F 40/126
(Continued)

FOREIGN PATENT DOCUMENTS

WO    WO-2018071106 A1 *   4/2018   ........... B64C 39/024

OTHER PUBLICATIONS

H. Ghazzai, H. Menouar and A. Kadri, "On the Placement of UAV Docking Stations for Future Intelligent Transportation Systems," 2017 IEEE 85th Vehicular Technology Conference (VTC Spring), Nov. 16, 2017, pp. 1-6. https://ieeexplore.ieee.org/document/8108676?source=IQplus. (Year: 2017).*

(Continued)

*Primary Examiner* — Jeff Zimmerman
*Assistant Examiner* — Hunter A Molnar
(74) *Attorney, Agent, or Firm* — Brandon Hicks; Eversheds Sutherland (US) LLP

(57) ABSTRACT

System and methods for a decentralized hybrid air-ground autonomous last-mile goods delivery are disclosed herein. A drone can include a controller configured to cause the drone to depart from a docking station of a vehicle, transmit a discovery message to available vehicles in an operating area, the discovery message having drone metadata, select at least one of one of the available vehicles based on response codes received from the available vehicle, or a nearest fixed docking station, and dock with a docking station of the one of the available vehicles or the nearest fixed docking station.

17 Claims, 5 Drawing Sheets

(51) Int. Cl.
    *B64U 80/86*    (2023.01)
    *B64U 101/60*    (2023.01)

(56) References Cited

U.S. PATENT DOCUMENTS

| | | | |
|---|---|---|---|
| 9,494,937 | B2 | 11/2016 | Siegel et al. |
| 2015/0324735 | A1* | 11/2015 | Lord .................... G06Q 10/083 |
| | | | 705/330 |
| 2016/0196756 | A1* | 7/2016 | Prakash ................. B64D 35/02 |
| | | | 701/3 |
| 2016/0293018 | A1 | 10/2016 | Kim et al. |
| 2017/0088288 | A1 | 3/2017 | Wang |
| 2018/0074485 | A1 | 3/2018 | Krishnamoorthy et al. |
| 2018/0137454 | A1* | 5/2018 | Kulkarni ................ B64C 39/024 |
| 2020/0269977 | A1* | 8/2020 | Noble ................. G08G 5/0021 |
| 2021/0109546 | A1* | 4/2021 | Christiana ............. B64C 39/024 |

OTHER PUBLICATIONS

Christian Tipantuna et al., "An NFV-Based Energy Scheduling Algorithm for a 5G Enabled Fleet of Programmable Unmanned Aerial Vehicles," Wiley Hindawi Wireless Communications and Mobile Computing, vol. 2019, Article ID4734821, Feb. 20, 2019, 21 pages.

\* cited by examiner

SYSTEMS AND METHODS FOR A DECENTRALIZED HYBRID AIR-GROUND AUTONOMOUS LAST-MILE GOODS DELIVERY

BACKGROUND

Last-mile delivery using unmanned aerial vehicles (UAVs) may involve factors such as fleet management and route assignment. Delivery vehicles may be configured to support a plurality or fleet of UAVs. However, the mobility of the delivery vehicles may impact UAV delivery operations. For example, a fleet of drones associated with a delivery vehicle may be assigned to distinct delivery routes. These delivery routes or destinations may be located remotely from one another making it difficult for some UAVs to return to the delivery vehicle. Moreover, UAVs can be limited in their operational range. These issues increase in settings where multiple delivery vehicles and fleets of UAVs may be operating.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure generally pertains to UAV (e.g., drone) management systems and methods. For example, systems and methods of the present disclosure can enable real-time drone-to-station assignment where drones, such as UAVs, can be launched from a first platform, deliver a package, and return to the first platform or another platform assigned to the drone when the first platform is unavailable.

In some instances, the systems and methods herein can determine how to manage fleets of delivery drones. After delivery, a drone can either dock back with the original delivery vehicle or dock somewhere else such as another delivery vehicle or a fixed docking station. The drone can be configured to ascend in the air to a specified height to gain line-of-sight to potential vehicles nearby. The drone then initiates a discovery phase to obtain information on all available in-range docking/charging stations. It then wirelessly broadcasts a "request" to discoverable/discovered stations with information regarding the drone's current status (location, remaining charge, and so forth).

Once a delivery vehicle receives this request the delivery vehicle can assign the drone a priority number indicating how urgently the delivery vehicle needs the drone and includes this number in its "response" back to the drone. This priority number can be computed based on any one or more of available docking stations, remaining deliverable goods in the vehicle, vehicle's future trajectory, and so forth. The drone may receive multiple responses from in-range vehicles. The drone can then select the delivery vehicle with the highest priority and send back a "select" message to that specific delivery vehicle. The loop is then closed by the delivery vehicle sending an acknowledgement message to the drone. In the acknowledgement message, the delivery vehicle informs the drone about the estimated docking location. The drone can then start its journey to its designated station. While in the air, the drone can communicate its location with the vehicle. If an update to the docking location/time is required—due to unforeseen circumstances such as traffic conditions—a new docking location/time is computed using the situational awareness algorithm and sent to the drone.

ILLUSTRATIVE EMBODIMENTS

Figure 1A:
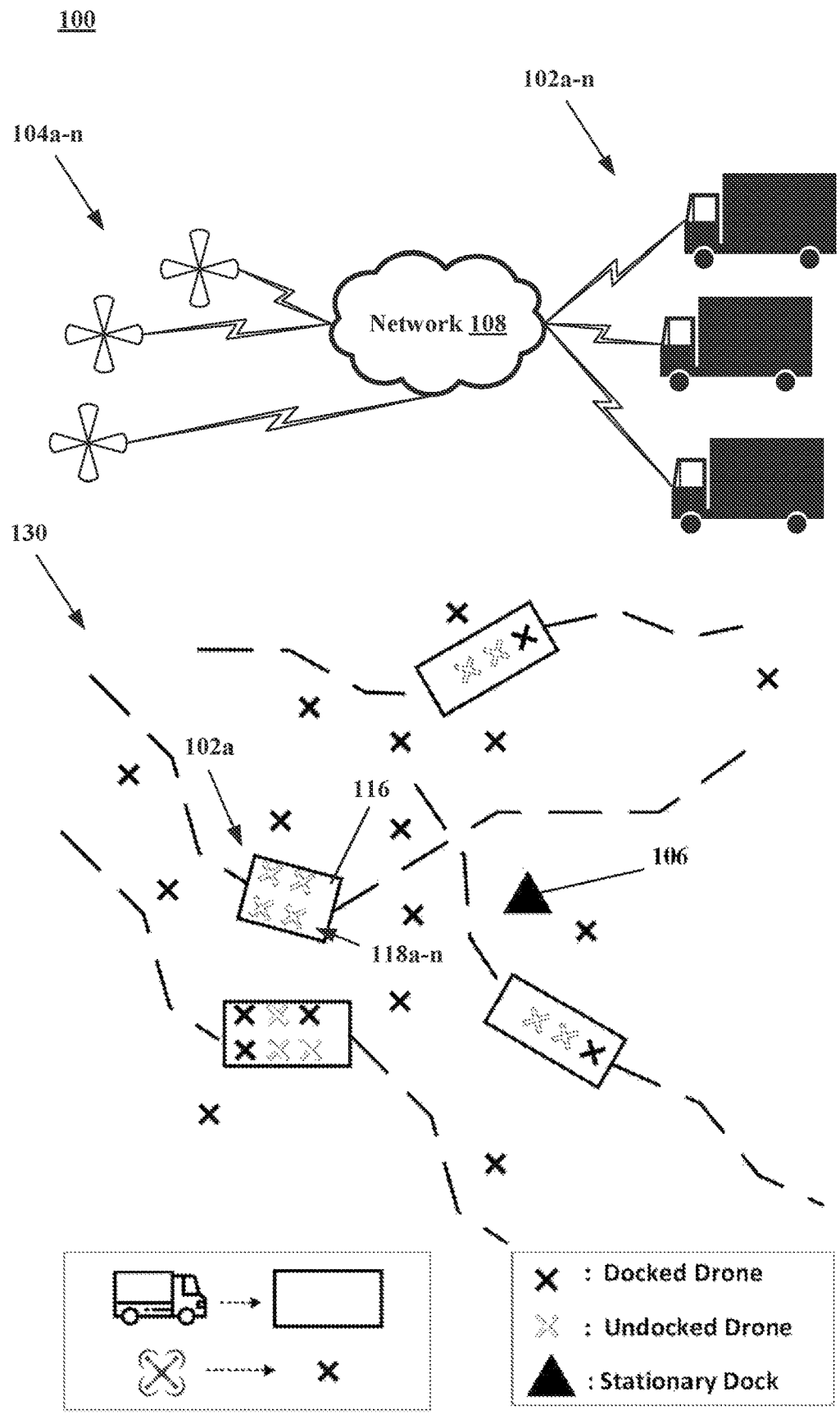
FIG. 1A illustrates an example architecture where the systems and method of the present disclosure may be practiced.

FIG. 1A depicts an illustrative architecture 100 in which techniques and structures for providing the systems and methods disclosed herein may be implemented. The architecture 100 can include one or more vehicles 102a-102n, one or more drones 104a-104n, a fixed docking station 106 (more than one fixed docking station can be present), and a network 108. The network 108 could include any public and/or private networks, which can include long-range and short-range wireless communications, as well as cellular and the like. Any of the elements illustrated in FIG. 1A can communicate using the network 108.

Figure 1B:
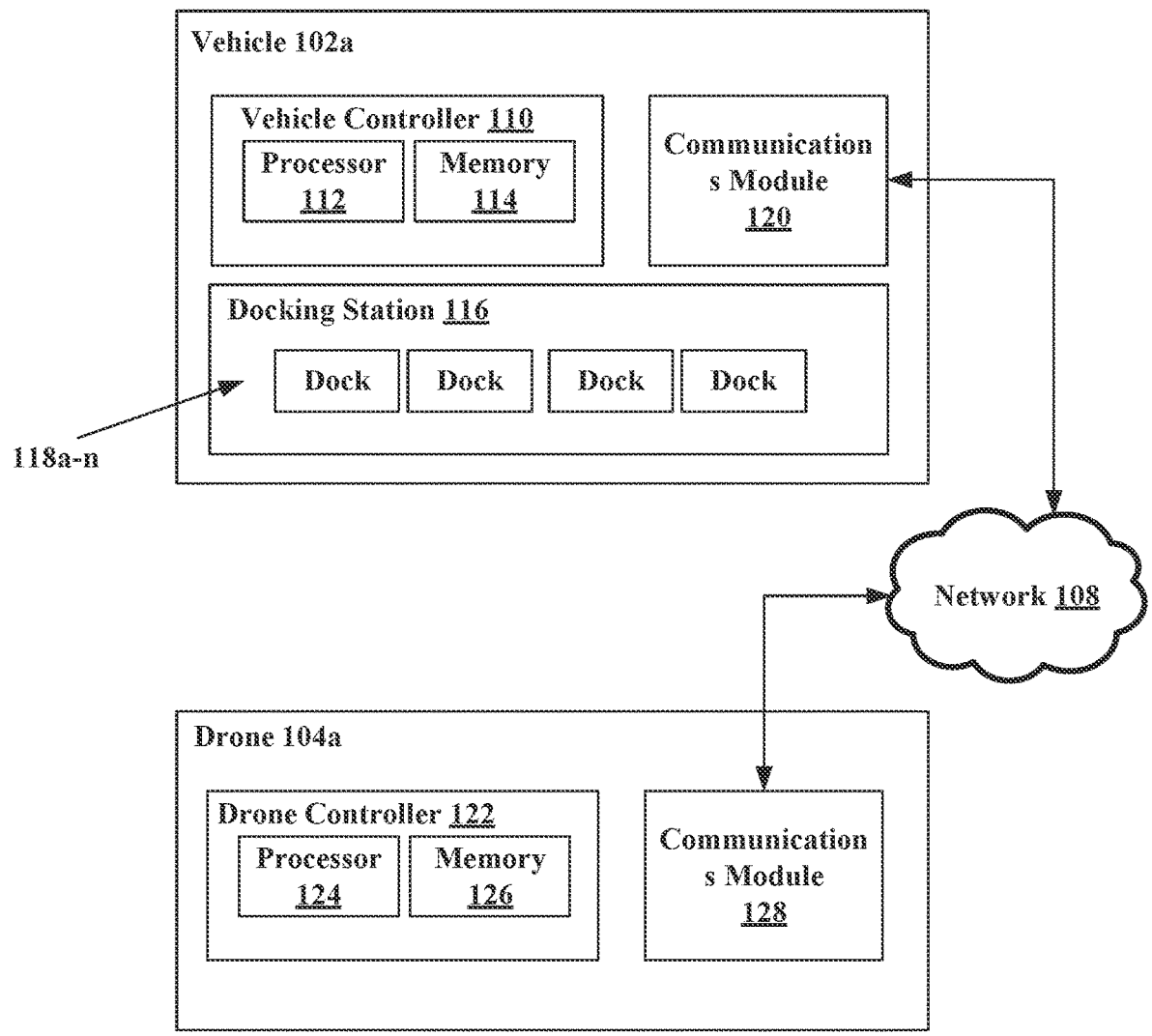
FIG. 1B schematically illustrates an example drone and vehicle configured in accordance with the present disclosure.

Referring collectively to FIGS. 1A and 1B, an example one of the vehicles, such as vehicle 102a can comprise a vehicle controller 110 having a processor 112 and memory 114 for storing executable instructions, the processor 112 can execute instructions stored in memory 114 for performing any of the decentralized drone-to-station functionalities disclosed herein such as dispatching drones for deliveries, processing drone metadata, and computing response codes—just to name a few. When referring to operations performed by the vehicle controller 110, it will be understood that this includes execution of instructions stored in memory 114 by the processor 112. The vehicle 102a can also comprise a docking station 116. As noted above, the docking station 116 can have docking/charging stations 118a-n for any number of drones. For context, the outlined Xs of a docking station indicate that the dock is unoccupied, while solid Xs indicate that the dock of a docking station is occupied with a drone. The vehicle 102a can include a communications module 120 that allows the vehicle controller 110 to communicate over the network 108 with other objects such as other delivery vehicles or drones.

An example one of the drones, such as the drone 104a can comprise a drone controller 122 having a processor 124 and memory 126 for storing executable instructions, the processor 124 can execute instructions stored in memory 126 for performing any of the decentralized drone-to-station functionalities disclosed herein. When referring to operations performed by the drone controller 122, it will be understood that this includes execution of instructions stored in memory 126 by the processor 124. These instructions can allow the drone to perform navigation and package delivery functions, as well as docking station discovery. The drone 104a can also comprise a communications module 128 that allows the drone controller 122 to communicate over the network 108 with vehicles, other drones, or fixed docking stations.

FIG. 1A also illustrates the management and assignment of one or more drones 104a-104n to one or more vehicles 102a-102n in a region for last-mile goods delivery 130. Drones illustrated in outlining, such as drone 104a are deployed while drone 104b is docked with a docking station of the vehicle 102a.

In this scenario, vehicles and drones can be dispatched to deliver goods to multiple locations in a residential area. In this scenario, each of the one or more vehicles 102a-102n can be equipped with multiple drone docking/charging stations. For example, the vehicle 102a may have one or more docking/charging stations 118a-n. The docking/charging stations can be located on a roof of the vehicle 102a, as an example. Any drone, upon completing a delivery can be assigned to any in-range docking/charging station. That is, a drone, such as drone 104a can be configured to find the fixed docking station 106 or any docking station on any of the one or more vehicles 102a-102n.

The determination as to which docking station to use can be made by the drone and/or in cooperation with other drones or vehicles in the operating area. That is, a drone can execute a decentralized algorithm for drone-to-station assignment that allows the drone to determine where it should land. In some instances, the docking station is a mobile docking station on a vehicle. In other instances, the docking station is a fixed docking station. In some instances, the drone can function in the absence of any backhaul connection to a service provider or coordination between the one or more vehicles 102a-102n.

The drone 104a can be dispatched (launch or depart) from the vehicle 102a. The drone 104a can be configured to deliver a package or other object to a recipient. Prior to launch, the drone 104a can store a location of the nearest fixed docking station, such as the docking station 106. The drone 104a can communicate with other drones in the area or directly with the vehicle 102a to report drone metadata to the vehicle 102a. In some instances, after delivery, the drone 104a can be configured to ascend to a discovery height to allow for line-of-sight communication with vehicles in the area.

Figure 2:
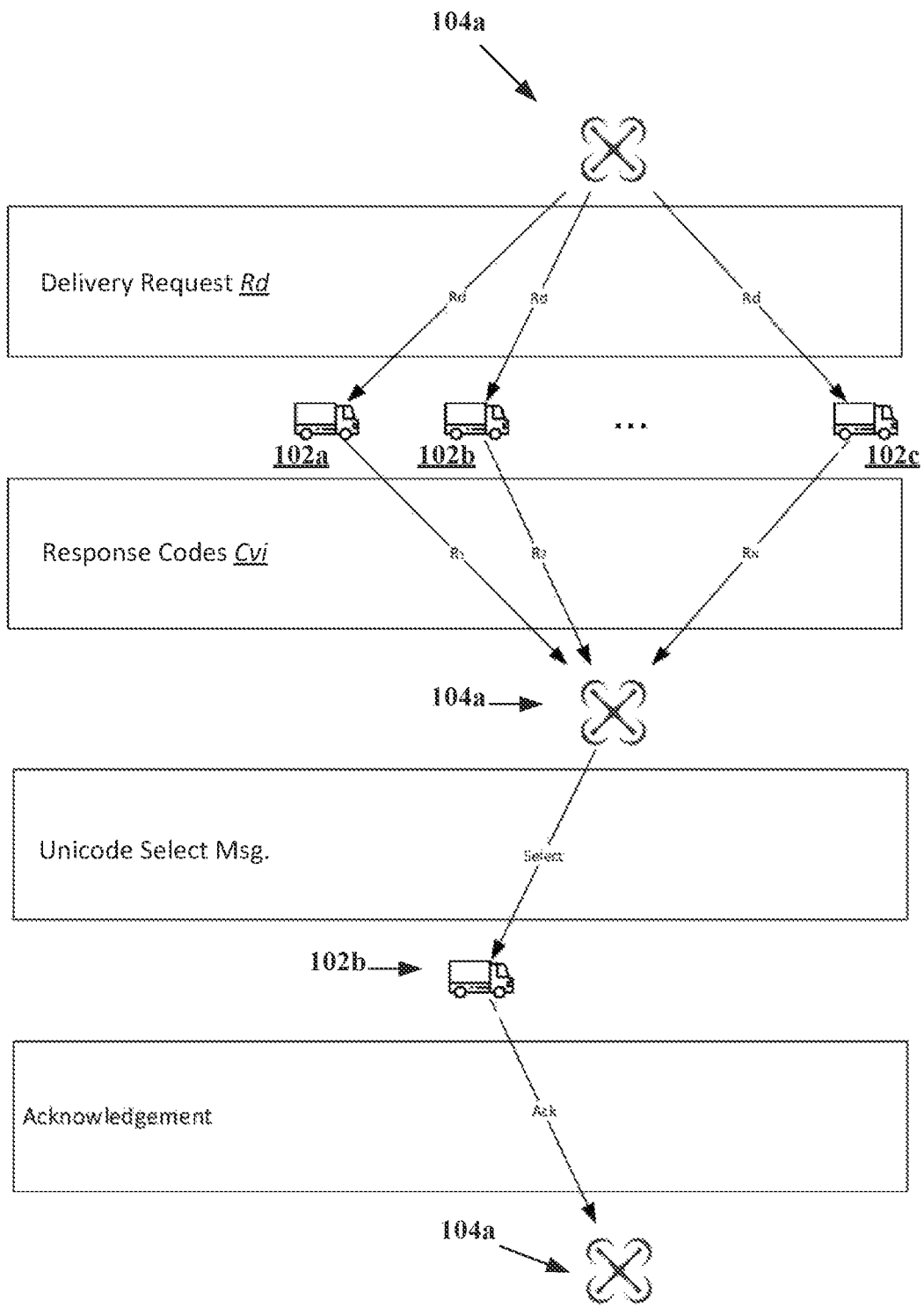
FIG. 2 is an example schematic flow of a decentralized delivery vehicle selection process of the present disclosure.

Referring now to FIGS. 1A, 1B, and 2 collectively, the drone 104a can broadcast drone metadata $R_d$ (in a delivery request for example) such as current location $l_d$, a remaining state of charge (correlated to remaining range) $b_d$, and drone type/model $D_t$. The vehicle 102a or other vehicles (such as vehicle 102b and vehicle 102c) receiving the broadcasted drone metadata $R_d$.

Each of the vehicles 102a, 102b, and 102c can compute a response code $C_{vi}$ based on one or more of following drone metadata $R_d$, vehicle location $l_v$, available docking stations $s_v$, remaining goods/packages to deliver $g_v$, remaining goods priorities $p_v$, and/or vehicle future route $r_v$. In some instances, other variables considered can include, but are not limited to the ability to charge the drone on vehicle (some or all docking stations have this capability), the number of available drones docking stations on a delivery vehicle, distance of the drone to nearby delivery vehicles, distance of the drone to the nearest fixed station, and goods/package delivery priority—just to name a few. In one example, the drone 104a can prioritize where it should land based on one or more factors. For example, the drone 104a may choose one vehicle over another (or possibly the fixed docking station 106) if the state of charge of the drone 104a is too low to allow the drone 104a to rendezvous with a chosen vehicle.

As noted, each vehicle can compute a response code $C_{vi}$. The vehicles can each transmit their response code $C_{vi}$ to the drone 104a. In one example, the drone can select the vehicle with highest response code $C_{vi}$ and send back a unicast "select" message to that specific vehicle. In this example, the second vehicle 102b is selected. The vehicle 102b receives the select message and estimates a docking location and a docking time. This tuple (estimated docking location, estimated docking time) is then transmitted to the drone 104a. Some estimation processes can consider more than two variables.

When received, the drone 104a can begin a process of landing at a docking station of the vehicle 102b. The docking location communicated to the drone 104a can indicate not only a geographical location where the vehicle 102b and the drone 104a can meet but also an available or open dock of the docking station of the vehicle 102a. The docking time is indicative of a time in the present or future where the drone 104a and vehicle 102b may meet.

As noted above, the drone 104a and the vehicle 102a can each share with one another their locations in real-time or near-real-time. This allows other drones and vehicles to freely traverse and perform additional deliveries when other already-dispatched drones are currently delivering goods. Thus, after dispatching a drone, the vehicle need not wait for the drone or follow the drone to the drone's destination in order for the drone to continue operating.

The drone 104a stores the location of the fixed docking station 106. If desired, the drone 104a can choose to land on the fixed docking station 106 rather than the vehicle 102b. For example, if the vehicle 102b is delayed and cannot meet the drone at the determined location and the determined time, the drone 104a can opt to land on the fixed docking station 106.

Figure 3:
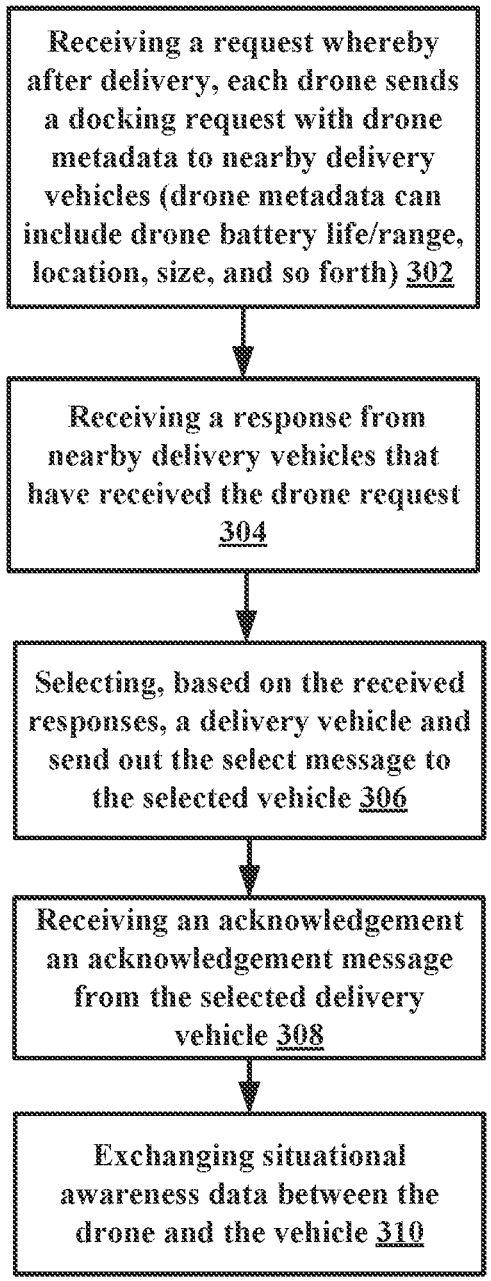
FIG. 3 is a flowchart of an example method of the present disclosure.

FIG. 3 is a flowchart of an example method. The method comprises a first process of drone assignment. The method can include a step 302 of receiving a request whereby after delivery, each drone sends a docking request with drone metadata to nearby delivery vehicles (drone metadata can include drone battery life/range, location, size, and so forth). The method can also include a step 304 of receiving a response from nearby delivery vehicles that have received the drone request. The vehicles can compute a response based on their parameters such as priority, load, route, and so forth.

The method further include a step 306 of selecting, based on the received responses, a delivery vehicle and send out the select message to the selected vehicle. The method can include a step 308 of receiving an acknowledgement an acknowledgement message from the selected delivery vehicle. The acknowledgement message can comprise information regarding where and when the drone may dock with the vehicle (e.g., estimated docking location).

The method can include a step 310 of exchanging situational awareness data between the drone and the vehicle. The drone can transmit a current location of the drone and the vehicle can transmit an updated, estimated docking time (can include an updated of the location as well) for the drone.

Figure 4:
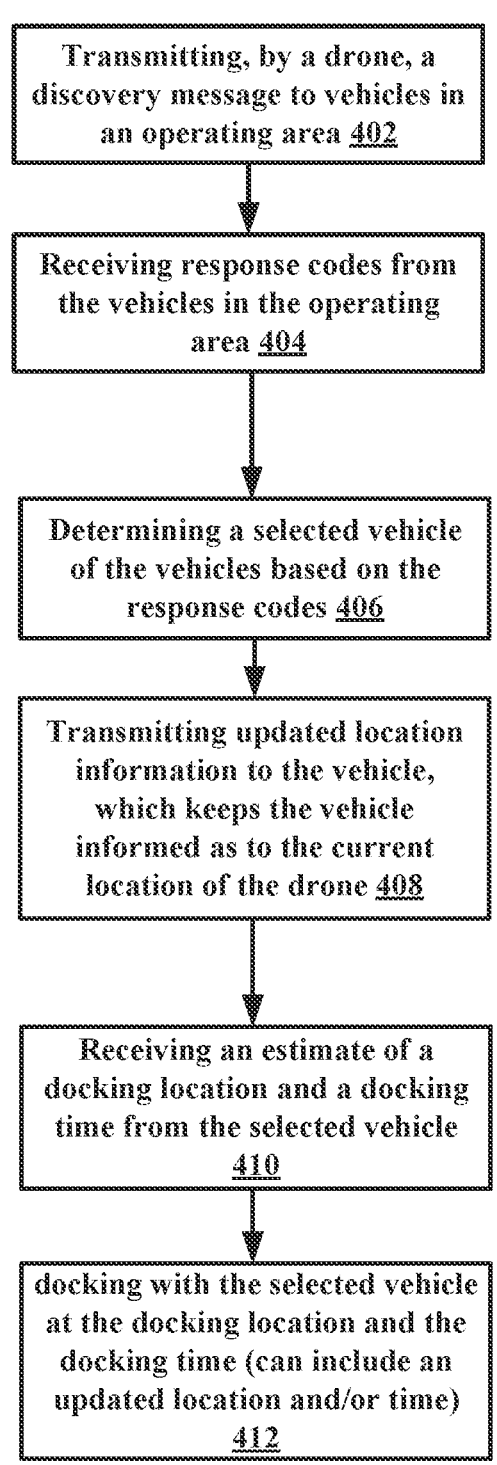
FIG. 4 is a flowchart of another example method of the present disclosure.

FIG. 4 is a flowchart of an example method. The method is performed in the context of a drone delivering a package to a destination. The drone is operating from a mobile delivery vehicle. The method can include a step 402 of transmitting, by a drone, a discovery message to vehicles in an operating area. The vehicles can include both the vehicle that launched the drone and other vehicles that may be within the operating area that are also configured to receive drones.

The method can include a step 404 of receiving response codes from the vehicles in the operating area. The response codes can be calculated by each vehicle that receives the discovery message. The discovery message can include drone metadata such as a done location, a remaining battery life (SoC of drone battery), and a drone type/model. The response code can also be based on vehicle-specific data such as a location of the vehicle, available docking stations of the vehicle, remaining items to deliver, and a vehicle route of the vehicle. The drone can select the vehicle having the highest value response code. Thus, the method can include a step 406 of determining a selected vehicle of the vehicles based on the response codes.

The method can include a step 408 of transmitting updated location information to the vehicle, which keeps the vehicle informed as to the current location of the drone. The method can also include a step 410 of receiving an estimate of a docking location and a docking time from the selected vehicle. The docking location and/or the time can be updated over time as needed. In some instances, the method includes a step 412 of docking with the selected vehicle at the docking location and the docking time (can include an updated location and/or time).

The method can also include steps such as determining drone metadata comprising any one or more of a drone location, a drone battery state of charge, and a drone type or model, as well as a step of assembling the discovery message that includes the drone metadata.

In some instances, the method can include the steps of determining a highest ranking response code of the response codes. To be sure, the highest ranking response code is associated with the selected vehicle. In response, the drone can transmit a unicode select message to the selected vehicle.

The method may also include a step of receiving a location of a nearest fixed docking station when the drone is dispatched from a first vehicle of the vehicles. The location of a nearest fixed docking station can be received and stored in the drone before it departs from the vehicle for a delivery.

Figure 5:
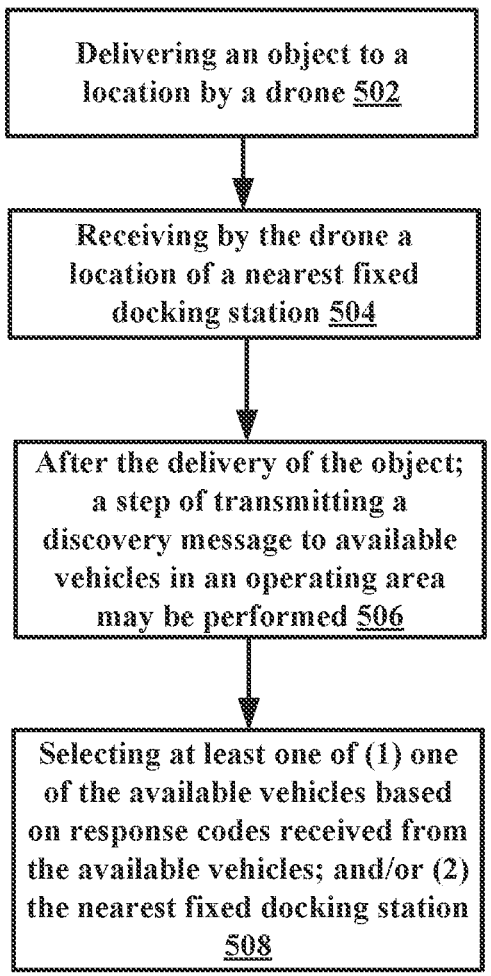
FIG. 5 is a flowchart of yet another example method of the present disclosure.

FIG. 5 is another example flowchart of a method of the present disclosure. The method can include a step 502 of delivering an object to a location by a drone. It will be understood that the drone may be dispatched from a docking station of a vehicle. Next, the method can include a step 504 of receiving by the drone a location of a nearest fixed docking station. Again, this step can occur prior to step 502 in some instances.

The method can also include a step 506 where after the delivery of the object; a step of transmitting a discovery message to available vehicles in an operating area may be performed. To be sure, the discovery message can comprise drone metadata. In some instances, the method can include a step 508 of selecting at least one of (1) one of the available vehicles based on response codes received from the available vehicles; and/or (2) the nearest fixed docking station. Again, the nearest fixed docking station can be utilized by the drone if the selected vehicle is unavailable or the drone requires immediate charging or repair, for example.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   transmitting, by a drone, a discovery message to vehicles in an operating area;
   calculating response codes with the vehicles in the operating area;
   receiving, at the drone, the response codes from the vehicles in the operating area, wherein each response code of the response codes that are received at the drone is based at least in part on a priority of at least one remaining goods in each vehicle of the vehicles;
   determining, based on the response codes, a selected vehicle of the vehicles;
   receiving an estimate of a docking location and a docking time from the selected vehicle;
   docking with the selected vehicle at the docking location and the docking time;
   responsive to receiving the response codes from the vehicles in the operating area, determining a highest ranking response code of the response codes, the highest ranking response code being associated with the selected vehicle;
transmitting a unicode select message to the selected vehicle;
receiving a location of a nearest fixed docking station when the drone is dispatched from a first vehicle of the vehicles, wherein the selected vehicle is not the first vehicle; and
landing the drone on the nearest fixed docking station if the selected vehicle is unable to meet at the estimated docking location at the estimated docking time.

2. The method according to claim 1, further comprising:
determining drone metadata comprising any one or more of a drone location, a drone battery state of charge, and a drone type or model; and
assembling the discovery message that includes the drone metadata.

3. The method according to claim 1, further comprising determining a response code by a vehicle of the vehicles further based on drone metadata, a location of the vehicle, available docking stations of the vehicle, remaining items to deliver, and a vehicle route of the vehicle.

4. The method according to claim 1, further comprising transmitting a current location of the drone to each of the vehicles when the drone is airborne.

5. The method according to claim 4, further comprising updating the docking location and the docking time based on the current location of the drone.

6. A method, comprising:
delivering an object to a location by a drone, the drone being dispatched from a docking station of a vehicle;
receiving by the drone a location of a nearest fixed docking station;
after the delivery of the object, transmitting a discovery message to available vehicles in an operating area, the discovery message comprising drone metadata;
calculating response codes with the available vehicles in the operating area;
receiving the response codes at the drone;
selecting at least one of:
one of the available vehicles based on the response codes received at the drone from the available vehicles, wherein each response code of the response codes is based at least in part on a priority of at least one remaining goods in each vehicle of the vehicles; or
the nearest fixed docking station;
docking with the one of the available vehicles or the nearest fixed docking station;
responsive to receiving the response codes from the available vehicles, determining a highest ranking response code of the response codes, the highest ranking response code being associated with the one of the available vehicles; and
transmitting a unicode select message to the one of the available vehicles.

7. The method according to claim 6, further comprising receiving an estimate of a docking location and a docking time from the one of the available vehicles.

8. The method according to claim 7, further comprising updating the docking location and the docking time based on a current location of the drone.

9. The method according to claim 8, further comprising receiving an indication of a docking station of a plurality of docking stations on the one of the available vehicles.

10. The method according to claim 6, further comprising determining the drone metadata from any one or more of a drone location, a drone battery state of charge, and a drone type or model.

11. The method according to claim 6, further comprising transmitting a current location of the drone to each of the vehicles when the drone is airborne.

12. A device, comprising:
a processor; and
a memory for storing executable instructions, the processor executing the instructions to:
depart from a docking station of a vehicle;
transmit a discovery message to available vehicles in an operating area, the discovery message comprising drone metadata;
select at least one of:
one of the available vehicles based on response codes calculated by the available vehicles, wherein each response code of the response codes is based at least in part on a priority of at least one remaining goods in each vehicle of the vehicles; or
a nearest fixed docking station;
dock with a docking station of the one of the available vehicles or the nearest fixed docking station;
responsive to receiving the response codes from the available vehicles, determine a highest ranking response code of the response codes, the highest ranking response code being associated with the one of the available vehicles; and
transmit a unicode select message to the one of the available vehicles.

13. The device according to claim 12, wherein the processor is configured to receive an estimate of a docking location and a docking time from the one of the available vehicles.

14. The device according to claim 13, wherein the processor is configured to determine the drone metadata from any one or more of a drone location, a drone battery state of charge, and a drone type or model.

15. The device according to claim 12, wherein the processor is configured to transmit a current location of the drone to each of the vehicles when the drone is airborne.

16. The device according to claim 15, wherein the processor is configured to update a docking location and a docking time based on the current location of the drone.

17. The method according to claim 1, wherein landing the drone on the nearest fixed docking station if the selected vehicle is unable to meet at the estimated docking location at the estimated docking time comprises choosing the fixed docking station over the selected vehicle because a state of charge of the drone is too low to allow the drone to meet with the selected vehicle.

* * * * *